United States Patent [19]

Dote

[11] Patent Number: 4,924,385

[45] Date of Patent: May 8, 1990

[54] METHOD OF DETECTING TYPES OF PARTS CONSTITUTING A LARGER GROUP OF PARTS

[75] Inventor: Kazumi Dote, Fussi, Japan

[73] Assignee: Casio Computer Co., Ltd., Tokyo, Japan

[21] Appl. No.: 261,586

[22] Filed: Oct. 24, 1988

[30] Foreign Application Priority Data

Oct. 26, 1987 [JP] Japan ................................. 62-268334
Oct. 26, 1987 [JP] Japan ................................. 62-268335

[51] Int. Cl.⁵ ............................................... G06F 9/00
[52] U.S. Cl. ................................................... 364/300
[58] Field of Search ................ 364/200, 300, 900, 489

[56] References Cited

U.S. PATENT DOCUMENTS

| | | | |
|---|---|---|---|
| 3,822,378 | 7/1974 | Kashio | 364/779 |
| 4,003,031 | 1/1977 | Kashio | 364/900 |
| 4,031,515 | 6/1977 | Kashio | 364/200 |
| 4,032,900 | 6/1977 | Kashio | 364/200 |
| 4,034,350 | 7/1977 | Kashio | 364/900 |
| 4,064,553 | 12/1977 | Kashio | 364/200 |
| 4,079,234 | 3/1978 | Kashio | 364/900 X |
| 4,103,334 | 7/1978 | Kashio | 364/900 |
| 4,133,041 | 1/1979 | Kashio | 364/900 |
| 4,145,753 | 3/1979 | Kashio | 364/900 |
| 4,831,543 | 5/1989 | Mastellone | 364/489 |

FOREIGN PATENT DOCUMENTS

| | | |
|---|---|---|
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |

Primary Examiner—Raulfe B. Zache
Attorney, Agent, or Firm—Frishauf, Holtz, Goodman & Woodward

[57] ABSTRACT

All the combinations of upper-level parent parts and lower-level child parts constituting parent-to-child relationships in the structure of the parts are registered in a predetermined file in advance. When an arbitrary upper-level parent part is designated, all the child parts which are associated with the parent part are extracted by referring to the file. It is then determined whether a combination of parts including each extracted part as a parent part is present or not. If it is present, the referring operation is repeated again by setting each extracted child part as a parent part. When it is determined that a combination is not present, a corresponding child part is output.

4 Claims, 8 Drawing Sheets

| cf | RK1 | RK2 | QUANTITY | FLAG |
|---|---|---|---|---|
| ( A | , a | , 2 | , L |
| ( A | , b | , 1 | , O |
| ( A | , c | , 3 | , L |
| ( a | , 01 | , 2 | , O |
| ( a | , 02 | , 2 | , O |
| ( a | , 03 | , 1 | , O |
| ( c | , 01 | , 4 | , O |
| ( c | , 04 | , 2 | , O |

| cf | RK1 | RK2 | FLAG |
|---|---|---|---|
| ( | 01 , | a , | H |
| ( | 01 , | c , | H |
| ( | 01 , | d , | H |
| ( | 02 , | a , | H |
| ( | 03 , | a , | H |
| ( | 04 , | c , | H |
| ( | 05 , | d , | H |
| ( | a , | A , | 0 |
| ( | a , | B , | 0 |
| ( | b , | A , | 0 |
| ( | b , | B , | 0 |
| ( | c , | A , | 0 |
| ( | d , | B , | 0 |

METHOD OF DETECTING TYPES OF PARTS CONSTITUTING A LARGER GROUP OF PARTS

CROSS-REFERENCE TO RELATED APPLICATION

Ser. No. 07/258,153, filed Oct. 14, 1988.

BACKGROUND OF THE INVENTION

1. Field of the Invention

The present invention relates to a method of detecting the types of lower-level parts constituting an arbitrary upper-level part, or the types of upper-level parts including an arbitrary lower-level part as a component.

2. Description of the Related Art

In the manufacturing industry for manufacturing various products, it is important to know the types and quantity of components (part elements) necessary for products to be manufactured in a certain period, or to know products for which certain parts are used. This process is usually called device explosion. Such a process can be manually performed if only a few types and a small quantity of components are required. However, if many types and a large quantity of components are used, the process becomes extremely cumbersome, and hence requires processing by a data processing apparatus such as a computer. However, it has not been fully studied how to efficiently perform the above-described processing in such a data processing apparatus.

SUMMARY OF THE INVENTION

It is an object of the present invention to efficiently and easily detect the types of lower-level child parts from an upper-level parent part, or detect the types of parent parts from a child part.

In order to achieve this object, according to the present invention, there is provided a method of detecting lower-level parts constituting an arbitrary upper-level part, the method comprising the steps of storing structure records of all combinations of upper-level parent parts and lower-level child parts constituting parent-to-child relationships in a structure of the parts, each of the structure records comprising a parent part code as a first word and a child part code as a second word, inputting an input record including a code of an arbitrary parent part, extracting all structure records including a code coinciding with a code of the input record as a first word from the file, determining whether a structure record including as a first word a code which coincides with a code of a second word of each of the extracted structure records is stored in the file in units of the extracted records, generating an input record including the code of the second word of each of the extracted structure records in units of the extracted structure records when it is determined that the structure record is stored, repeating the extraction and determination steps in units of the generated input records, and outputting the code of the second word of each of the extracted structure records when it is determined that the record is not stored.

Accordingly, the present invention is advantageous in that the types of child parts constituting an arbitrary parent part can be efficiently obtained by only storing all the combinations of upper-level parent parts and lower-level child parts which hold certain parent-to-child relationships in the structure of the parts, and a simple arrangement and a high processing speed can be realized.

In addition, according to the present invention, there is provided a method of detecting all upper-level parts including an arbitrary lower-level part as a component, the method comprising the steps of storing structure records including all combinations of lower-level child parts and upper-level parent parts constituting child-to-parent relationships in a structure of the parts in a predetermined file, each of the structure records comprising a child part code as a first word and a parent part code as a second word, inputting an input record including a code of an arbitrary child part, extracting all structure records including as a first word a code which coincides with the code of the input record from the file, determining whether a structure record including as a first word a code which coincides with a code of a second word of each of the extracted structure records is stored in the file in units of the extracted structure records, generating an input record including the code of the second word of each of the extracted structure records in units of the extracted structure records when it is determined that the structure record is stored, outputting the code of the second word of each of the extracted structure records when it is determined that the structure record is not stored, and repeating the respective steps in units of the input records generated in the generation step.

Accordingly, the present invention is advantageous in that all the types of parent parts including an arbitrary child part as a component can be efficiently obtained by only storing all the combinations of lower-level child parts and upper-level parent parts which hold certain child-to-parent relationships in the structure of the parts, and a simple arrangement and a high processing speed can be realized.

BRIEF DESCRIPTION OF THE DRAWING

FIG. 3 is a view showing a first storage state in a first file;

FIGS. 7 and 8 are views for explaining a first changed state of the contents in each file;

DETAILED DESCRIPTION OF THE PREFERRED EMBODIMENTS (1) First Embodiment

Figure 1:
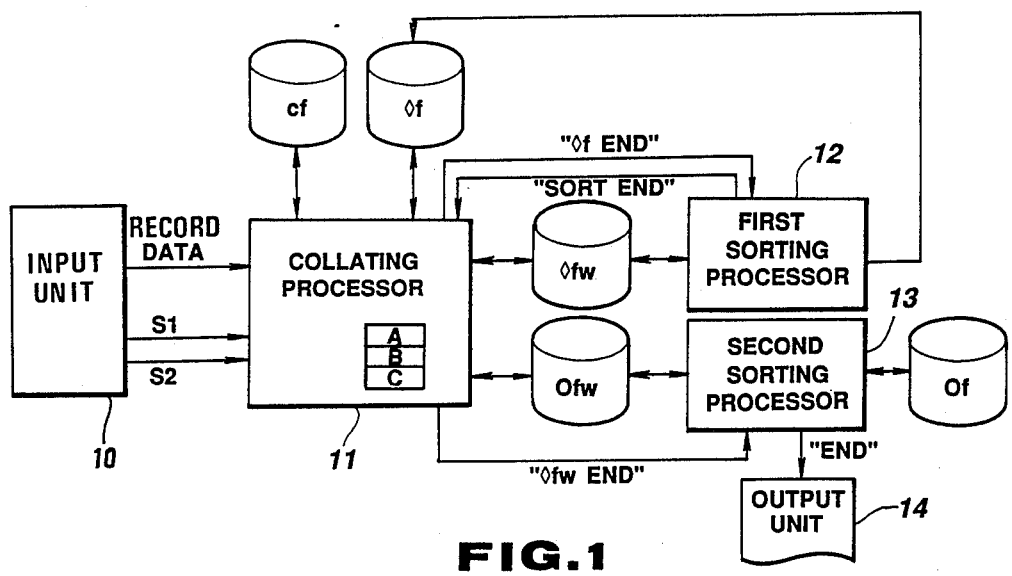
FIG. 1 is a block diagram showing a data processing apparatus for performing a method according to the present invention.

FIG. 1 is a block diagram showing a data processing apparatus for performing device explosion. Referring to FIG. 1, reference symbol cf denotes a first file (structure file) for storing data of a plurality of records including all the records from a record in which a final product is a parent part to a record in which a part having a second lowest level is a parent part. The data of one record (structure record) comprises a pair of codes of parts constituting a parent-to-child relationship as first and second key words, a data word representing "quantity" of child parts required to assemble the parent part, and a word of "flag" representing the presence/absence of a lower-level child part of a level next to that of the above child part (part required to assemble the child part). Reference symbol ◇f denotes a second file (input file) for storing a record (input record) comprising the part code of a parent part as a key word and "quantity" of the part code as a data word; ◇fw and ofw, third and fourth files respectively used as work areas; and of, a fifth file (output file) for storing a record (output record) obtained by device explosion.

Reference numeral 11 denotes a collating processor for collating/extracting a record, in which the part code coinciding with the part code which is the key word of the record stored in second file ◇f is set as a first key word, from first file cf, detecting the presence/absence of a lower-level child part by referring to the word of "flag" of the extracted record, forming a new record comprising the part code of the child part which is the second key word of the extracted record as a key word and data obtained by multiplying the data word of "quantity" of the extracted record by the data word of "quantity" of the record stored in second file ◇f as a new data word of "quantity" and causing third file ◇fw to store the new record when a lower-level child part is present, and causing fourth file ofw to store a new record consisting of the part code of the child part which is the second key word of the extracted record as a key word and data obtained by multiplying the data word of "quantity" of the extracted record by the data word of "quantity" of the record stored in second file ◇f as a new data word of "quantity" when a lower-level child part is not present. In addition, if third file ◇fw is referred and a record is stored when collation of all the records stored in second file ◇f is completed, collating processor 11 outputs end signal "◇f END". If no record is stored, it outputs end signal "◇fw END".

Reference numeral 12 denotes a first sorting processor for clearing the contents of third file ◇fw after collating third file ◇fw, sorting records therein in the order of key words, and writing the sorted records in second file ◇f upon reception of end signal "◇f END" from collating processor 11. Reference numeral 13 denotes a second sorting processor for sorting and counting records stored in fourth file ofw in the order of key words, storing the records in fifth file of upon reception of end signal "◇fw END", and outputting end signal "END" representing the end of device explosion in the data processing apparatus. Reference numeral 14 denotes an output unit for receiving end signal "END" from second sorting processor 13 and printing out data indicating reception of the signal and the contents stored in fifth file of.

First and second key words, a data word of "quantity", and a word of "flag" constituting each record are input/stored by an operator in first file cf from an input unit 10 through collating processor 11. In addition, collating processor 11 performs two types of processing in accordance with instructions from the input unit (not shown), i.e., signals "S1" and "S2".

An operation of calculating the quantity of components of finished product A having a relationship represented by a component table shown in FIG. 2 will be described below. As is apparent from FIG. 2, finished product A is constituted by two parts a, one part b, and three parts c. Part a is constituted by two parts 01, two parts 02, and one part 03. Part c is constituted by four parts 01 and two parts 04.

When the operator inputs record data representing relationships between the respective parts on the basis of such a component table, collating processor 11 stores the record data in first file cf. In this case, as shown in FIG. 3, each record consists of the part code of a parent part as first key word "RK1" and the part code of a child part as second key word "RK2" both of which represent a combination of related parent and child parts, a data word of "quantity" of child parts required for assembling the parent part, and a word of flag "L" or "0" representing the presence/absence of a lower-level child part of a level next to that of the above child part. The operator inputs each record in units of words while dividing the words by delimiter codes. Note that codes "(" and "," are record and word delimiter codes, respectively. Code "/" represents the absence of word data. The data of all the records from a record in which finished product A is a parent part to a record in which a child part having a second lowest level is a parent part are stored in first file cf in this manner.

Figure 2:
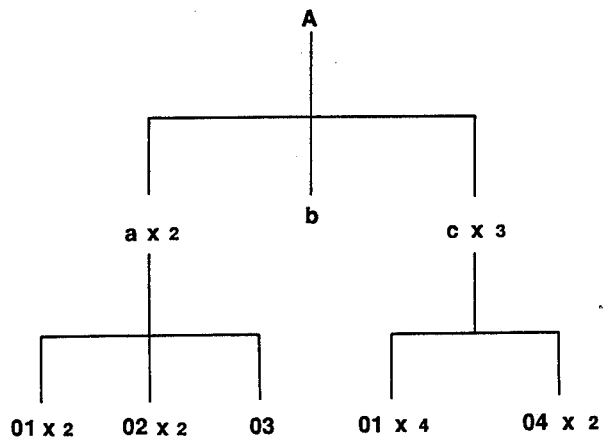
FIG. 2 is a view showing a first component table.

FIG. 3 shows record data which is input in first file cf on the basis of the component table in FIG. 2. This input method is very simple. More specifically, since finished product A is constituted by two parts a, one part b, and three parts c, three records representing the relationships between the parent part and the child parts are required first. Lower-level parts are further present with respect to parts a and c (parts 01, 02, and 03 for part a, and parts 01 and 04 for part c), whereas no lower-level part is present with respect to part b. Consequently, of the three records, flags "L" are set in the records representing the relationships between parent part A and child part a and between parent part A and child part c, whereas flag "0" is set in the record representing the relationship between parent part A and child part b. Thus, "(A,a,2,L)" is input as a first record in first file cf. Then, "(A,b,1,0)" and "(A,c,3,L)" are sequentially input as second and third records, respectively. Note that all the parts are encoded and are input as part codes. Since part a is constituted by three parts 01, 02, and 03, and part c is constituted by two parts 01 and 04, records representing these relationships must be input. In this case, since respective parts 01, 02, 03, and 04 have no lower-level part, all the flags in the records become "0". Consequently, three records in which part a is a parent part, i.e., "(a,01,2,0)", "(a,02,2,0)", and "(a,03,1,0)" are input. Then, two records in which part is a parent part, i.e., "(c,01,4,0)" and "(c,04,2,0)" are input. With this operation, input of all the records representing the parent and child parts is completed. Such data can be very simply set even by an unskilled operator.

Note that since all the part codes input as first and second key words are encoded, records can be sorted in the order of key words. Assume, therefore, that first file cf stores records sorted in the order of key words.

Figure 4:
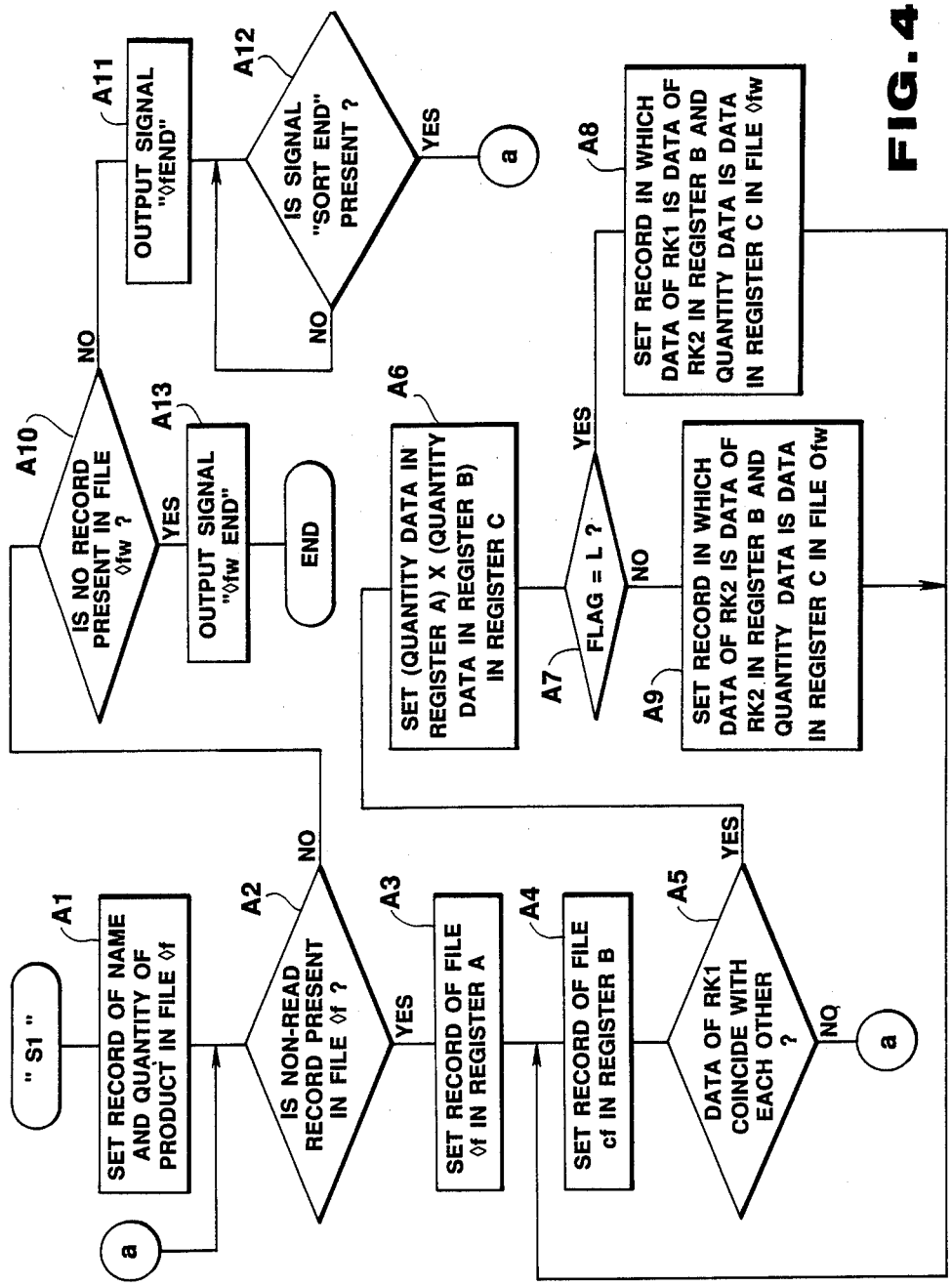
FIG. 4 is a flow chart showing the contents of first processing in collating processor 11.

The embodiment will be further described by exemplifying a case wherein the number of child parts required to manufacture 100 finished products A is obtained. In this case, when signal "S1" is supplied from the input unit 10 by the operator after the product code of the product and the number of products are input, collating processor 11 starts processing shown in a flow chart of FIG. 4. More specifically, the record consisting of the product name (parent part code) as a first key word and the number of products as a data word which have been input by the operator is set in second file ◇f (step A1).

It is determined whether a record is present in second file f (step A2). If YES is determined in step A2, this record is set in register A in collating processor 11 (step A3). Then, a record in first file cf is read out and is set in register B in collating processor 11 (step A4). The first key word of the record in register A is compared with the first key word of the record in register B (step A5).

If they coincide with each other, the data of "quantity" of the record in register A is multiplied by the data of "quantity" of the record in register B. The multiplication result is set in register C in collating processor 11 (step A6). The word of "flag" of the record in register B is then referred (step A7). If the flag is "L", a new record consisting of the contents of the first key word of the record in register B as a first key word and the contents in register C as a data word of "quantity" (in this record, data corresponding to a second key word is not present) is formed. After the new record is set in third file ◇fw (step A8), the flow returns to step A4.

If the flag of the record in register B is "0" in step A7, a new record comprising the contents of the second key word of the record in register B as a second key word and the contents of "quantity" of the record in register C as a data word (this record includes no data corresponding to a first key word) is formed. After this new record is set in fourth file ofw (step A9), the flow returns to step A4.

Records having first key words coinciding with the first key word of the record input in second file ◇f are sequentially extracted from first file cf, and corresponding new records are sequentially set in third or fourth file ◇fw or ofw in this manner. When the first key word of a record read out from first file cf does not coincide with the first key word of the record read out from second file ◇f in step A5, collating processor 11 determines whether other records are present in second file ◇f or not (step A2). If NO is obtained in step A2, third file ◇fw is referred (step A10). If a record is present in third file ◇fw, end signal "◇f END" is output to first sorting processor 12 (step A11). After the flow is waited until signal "sort END" is supplied from first sorting processor 12 (step A12), it returns to step A2.

Figure 5:
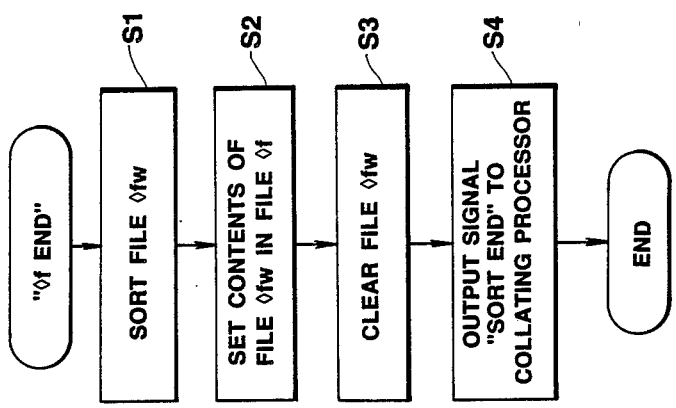

When first sorting processor 12 receives end signal "◇f END" from collating processor 11, sorting is executed as shown in a flow chart of FIG. 5. More specifically, the records in third file ◇fw are sorted in the order of first key words (step S1). The resultant contents are set in second file (step S2). After the contents in third file ◇fw are cleared (step S3), signal "sort END" is output to collating processor 11 (step S4).

Figure 6:
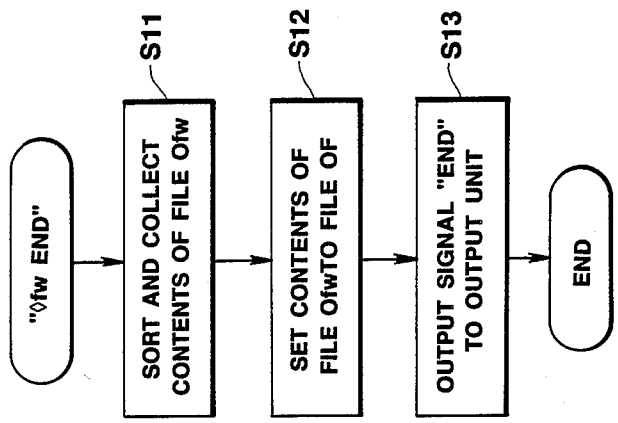
FIGS. 5 and 6 are flow charts showing the contents of processing in first and second sorting processors 12 and 13.

When second sorting processor 13 receives end signal "◇fw END" from Collating processor 11, it executes sort processing as shown in a flow chart of FIG. 6. More specifically, the records in fourth file ofw are sorted and counted in the order of second key words (step S11). The resultant contents are set in fifth file of (step S12). Then, second sorting processor 13 outputs end signal "END" to output unit 14 (step S13).

Figures 7, 8:
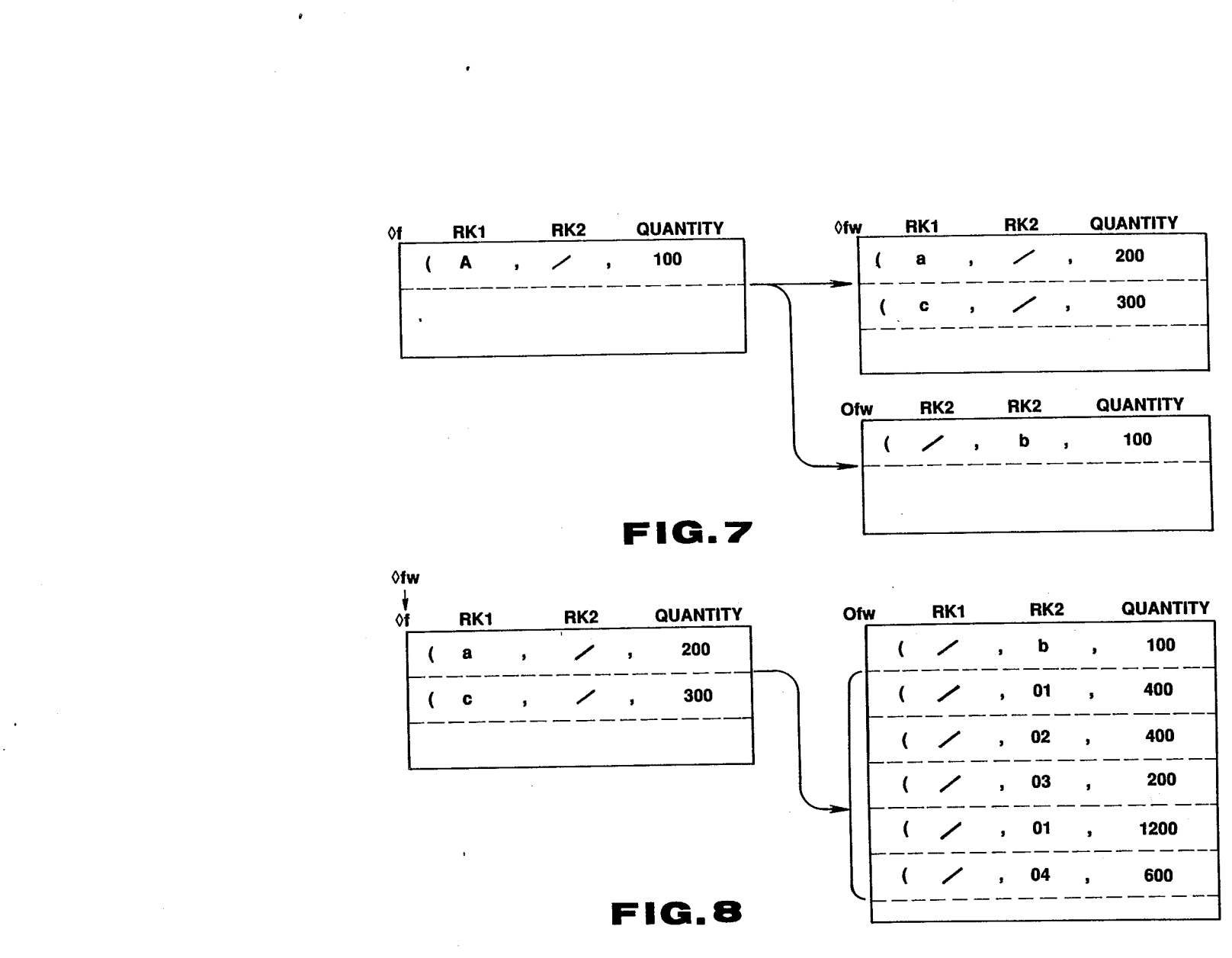

FIGS. 7 and 8 are views for explaining the changed states of the contents of each file on the basis of the above operation. FIG. 7 shows the contents of new records respectively set in third and fourth files ◇fw and ofw on the basis of record "(A,/,100)" associated with finished product A input by the operator. FIG. 8 shows the contents of records further added to the record in fourth file ofw on the basis of two records "(a,/,200)" and "(c,/,300)" which are moved from third ◇fw into second file ◇f upon setting of the above records. Since the part codes and quantity of all the necessary parts are calculated and stored in fourth file ofw, the contents are sorted and counted in the order of second key words, and are stored in fifth file of.

Subsequently, in response to end signal "END" from second sorting processor 13, output unit 14 reads out the contents of fifth file of and prints them out. That is, in the embodiment, output unit 14 prints out data representing that in order to manufacture 100 finished products A, 100 parts b, 1,600 parts 01 (=400+1,200), 400 parts 02, 200 parts 03, and 600 parts 04 are required.

(2) Second Embodiment

According to a second embodiment, by designating a child part, all the parent parts including the child part as a component are obtained in an apparatus having the same arrangement as that of the above-described data processing apparatus. The embodiment will be described below with reference to the above-described block diagram in FIG. 1.

First file cf shown in FIG. 1 stores the data of a plurality of records including all the combinations of child and parent parts. In this case, each record consists of a pair of part codes of parts constituting a child-to-parent relationship as first and second key words, and a word of "flag" representing the presence/absence of an upper-level parent part of a level next to that of the above child part (part including the child part as a component). The part code of a child part to be extracted is stored in second file ◇f as a key word.

Collating processor 11 collates/extracts a record in which the part code coinciding with the part code as the key word of the record stored in second file ◇f is set as a first key word from first file cf, and refers to the word of "flag" of the extracted record, thereby detecting the presence/absence of an upper-level parent part. When an upper-level parent part is present, a record in which the part code of the parent part as the second key word of the extracted record is a key word is stored in third file ◇fw. When no upper-level parent part is present, the extracted record is stored in fourth file ofw.

Figures 9, 10:
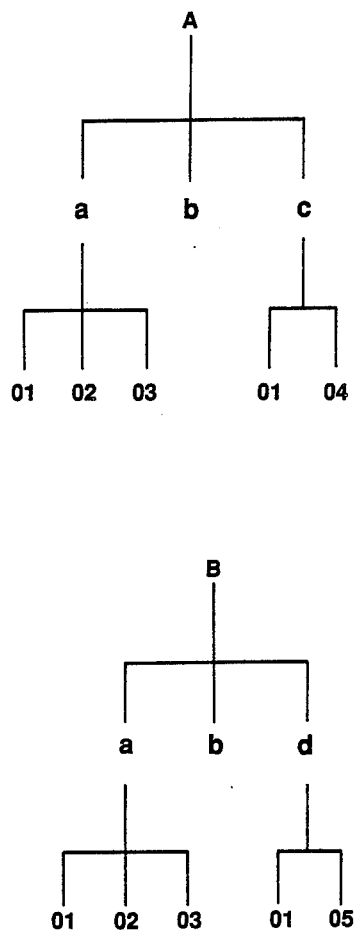
FIG. 9 is a view showing a second component table.
FIG. 10 is a view showing a second storage state in the first file.

An operation of the data processing apparatus having above-described arrangement will be described below. Assume that finished products A and B represented by a component table shown in FIG. 9 are present. As is apparent from FIG. 9, finished product A is constituted by parts a, b, and c, and finished product B by parts, a, b, and d. Part a is constituted by parts 01, 02, and 03. Part c is constituted by parts 01 and 04, and part d by parts 01 and 05.

When records representing the relationships between the respective parts are input by the operator on the basis of such a component table, collating processor 11 stores these record data in first file cf. In this case, the operator sequentially inputs records in units of words by dividing the words by delimiter codes. As shown in FIG. 10, each record consists of a combination of related child and parent part codes as first and second key words "RK1" and "RK2", respectively, and a word of "flag" representing the presence/absence of an upper-level parent part of a level next to that of the child part by using flag "H" or "0". Note that codes "(", and ","
are record and word delimiter codes, respectively.
Code "/" represents the absence of data. The data of
records including all the relationships between the parent
and child parts is stored in first file cf in this manner.

FIG. 10 shows record data which is input in first file
cf on the basis of the component table shown in FIG. 9.
The input method of the data is very simple. Lower-level
parts 01, 02, 03, 04, and 05 are considered first.
Part 01 is a component of parts a, c, and d. Therefore,
three records "(01,a,H)", "(01,c,H)", and "(01,d,H)"
representing this relationship are input. In this case,
flags "H" are input as the flags of the respective records
because parts a, c, and d further include parts A and B
as parent parts. Since part 02 is a component of part a,
record "(02,a,H)" representing this relationship is input.
Since part 03 is a component of part a, record
"(03,a,H)" representing this relationship is input. Since
part 04 is a component of part c, record "(04,c,H)"
representing this relationship is input. In addition, since
part 05 is a component of part d, record "(05,d,H)"
representing this relationship is input. Next, upper-level
parts a, b, c, and d are considered. Since part a is a
component of part A and B, two records "(a,A,0)" and
"(a,B,0)" representing this relationship are input. In this
case, flags "0" are input as the flags of the respective
records because parts A and B are the uppermost-level
parent parts. Since part b is a component of parts A and
B, two records "(b,A,0)" and "(b,B,0)" representing this
relationship are input. Since part c is a component of
part A, record "(c,A,0)" representing this relationship is
input. In addition, since part d is a component of part B,
record "(d,B,0)" representing this relationship is input.
With this operation, input of all the records representing
the relationships of the child and parent parts is
completed. This operation can be very easily performed
even by an unskilled operator.

Figure 11:
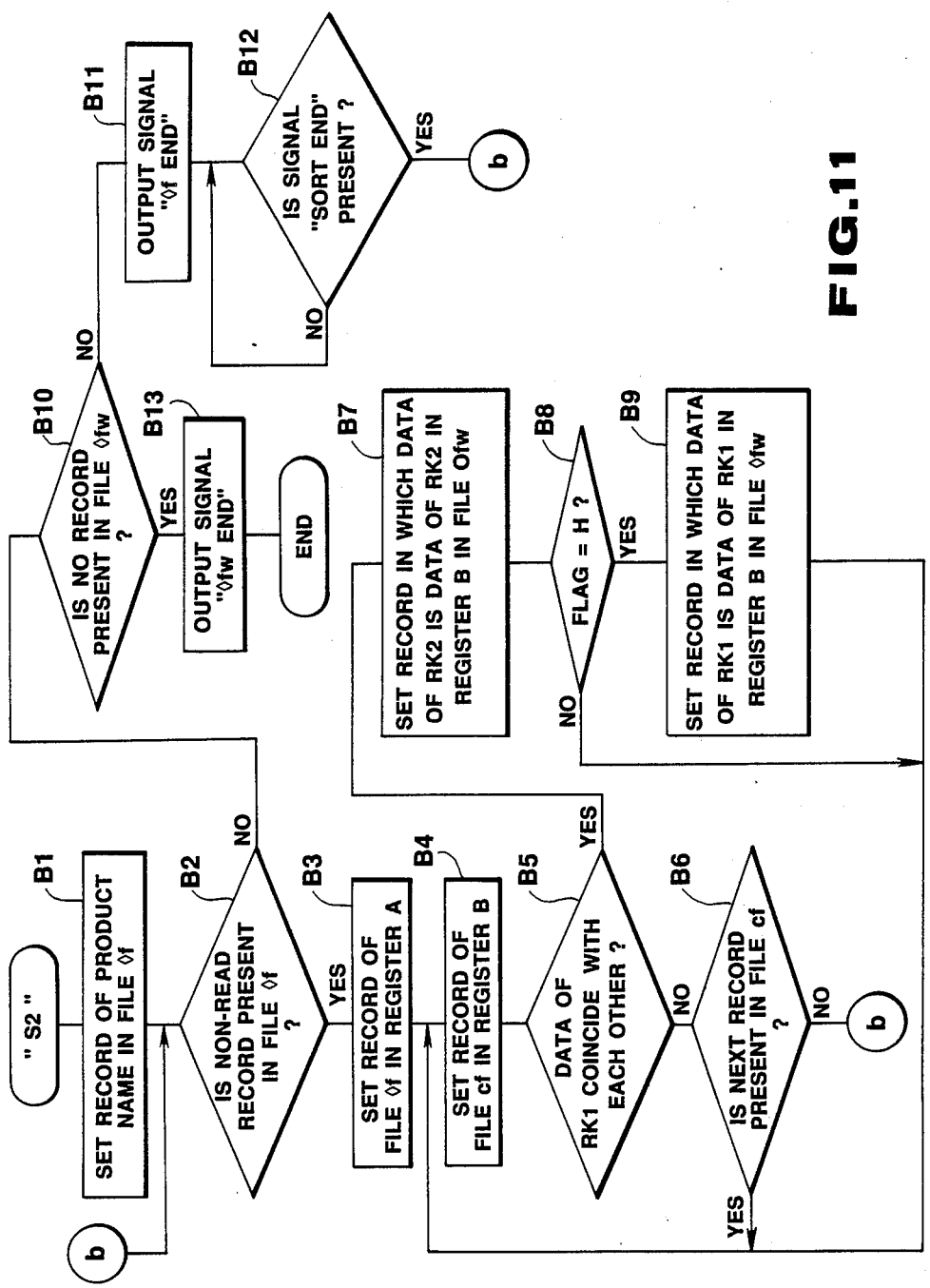
FIG. 11 is a flow chart showing the contents of second processing in collating processor 11.

Assume that all the parent parts using part 01 are to
be detected. When signal "S2" is supplied from the
input unit 10 by the operator after the part code of part
01 is input, collating processor 11 starts processing
shown in a flow chart of FIG. 11. More specifically, a
record in which the part code of the child part which
has been input by the operator is the first key word is set
in second file ◇f (step B1).

It is determined whether a record is present in second
file ◇f (step B2). If YES is determined in step B2, this
record is set in register A in collating processor 11 (step
B3). Then, a record is read out from first file cf and is set
in register B in collating processor 11 (step B4). The
first key word of the record in register A is compared
with the first key word of the record in register B (step
B5).

When they coincide with each other, a new record
comprising the contents of the second key word in
register B as the second key word is formed (this record
does not include the data of a first key word). This
record is set in fourth file ofw.

The word of "flag" of the record in register B is then
referred (step B8). If it is "0", the flow returns to step
B4. If it is "H", a new record including the contents of
the second key word in register B as the first key word
(note that this record does not include the data of a
second key word) is formed. This record is set in third
file ◇fw and the flow returns to step B4.

When records newly formed in this manner are sequentially
set in third or fourth file ◇fw or ◇fw, the
contents of the first key words of the records in registers
A and B do not coincide with each other in step B5,
it is determined whether a non-retrieved record is present
in first file cf (step B6). If YES is determined, the
flow returns to step B4. If NO is determined in step B6,
the flow returns to step B2 and it is determined whether
a non-readout record is present in second file ◇f.

If no other record is present in second file ◇f, third
file ◇fw is referred (step A10). If a record is present in
file ◇fw, end signal "◇f END" is output to first sorting
processor 12 (step B11). After the flow is waited until
signal "sort END" is supplied from first sorting processor
12 (step B12), it returns to step B2.

When first sorting processor 12 receives end signal
"◇f END" from collating processor 11, it executes
processing shown in the flow chart of FIG. 5 described
above.

When second sorting processor 13 receives end signal
"◇fw END" from collating processor 11, it executes
processing shown in the flow chart of FIG. 6 described
above.

Figure 12:
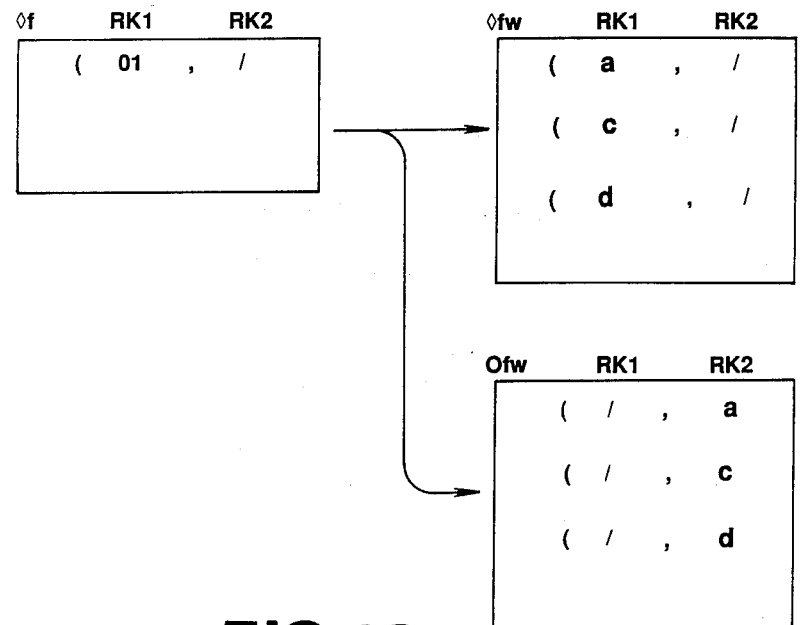
FIGS. 12 and 13 are views for explaining a first changed state of the contents in each file.
Figure 13:
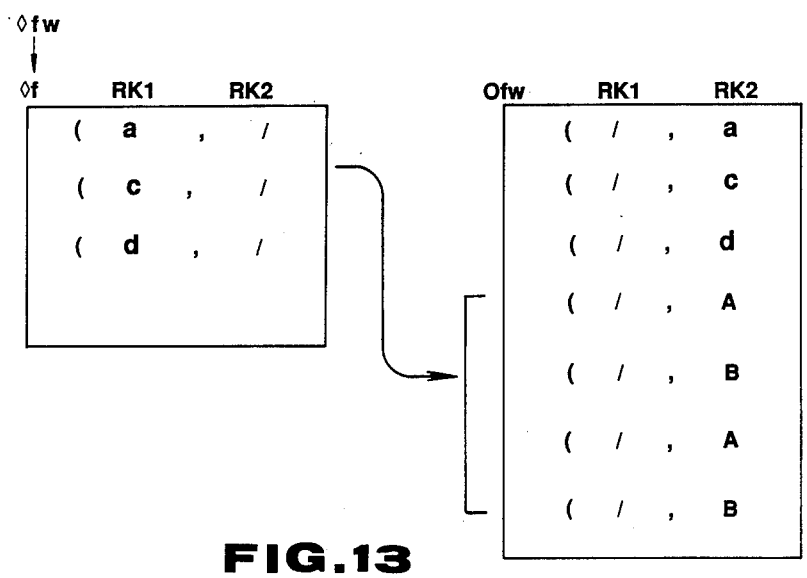

FIGS. 12 and 13 show the changed states of the contents
of the respective files based on the abovedescribed
operation. FIG. 12 shows the contents of a record
newly set in third or fourth file ◇fw or ofw on the basis
of record "(01,/)" associated with part 01 which has
been input by the operator. FIG. 13 shows the contents
of a record which is further added to fourth file ofw on
the basis of three records "(a,/)", "(c,/)", and "(d,/)"
shifted from third file ◇fw to second file ◇f after the
above record is set. Since the part codes of all the retrieved
parent parts are stored in fourth file ofw as the
second key words in units of records, these contents are
shifted to fifth file of.

After this operation, in response to end signal "END"
from second sorting processor 13, output unit 14 reads
out the contents of fifth file f and prints out the readout
contents. That is, according to the above embodiment,
output unit 14 prints out the data representing that the
parent parts using part 01 includes parts a, c, and d as
intermediate-level parts, and parts A and B as upper-level
parts.

What is claimed is:

1. A method of detecting lower-level parts constituting
an arbitrary upper-level part, the method comprising
the steps performed with a computer of:
prestoring structure records of all combinations of
upper-level parent parts and lower-level child parts
constituting parent-to-child relationships in a file,
each of the structure records comprising a parent
part code as a first word and a child part code as a
second word;
inputting an input record including a code of an arbitrary
parent part;
extracting all structure records including a code coinciding
with a code of the input record as a first
word from said file;
determining whether a structure record including as a
first word a code which coincides with a code of a
second word of each of the extracted structure
records is stored in said file in units of the extracted
records;
generating an input record including the code of the
second word of each of the extracted structure
records in units of the extracted structure records
when it is determined that the structure record is
stored;
repeating the extraction and determination steps in
units of the generated input records; and outputting the code of the second word of each of the extracted structure records when it is determined that the record is not stored.

2. The method according to claim 1, wherein
each of the structure records includes a flag word representing whether a code of a second word thereof is included in a first word of other structure records, and
in the determination step, it is determined whether a structure record including as a first word a code which coincides with a code of a second word of each of the extracted structure records is stored in said file by determining a content of a flag word in units of the extracted structure records.

3. A method of detecting all lower-level parts constituting an arbitrary upper-level part, the method comprising the steps performed with a computer of:
prestoring structure records including all combinations of upper-level parent parts and lower-level child parts constituting parent-to-child relationships in a structure file, each of the structure records comprising a parent part code as a first word, a child part code as a second word, and data of a quantity of the child part as a third word;
inputting an arbitrary input record including a code of an upper-level part and data of a required quantity thereof in an input file;
extracting all structure records including as a first word a code which coincides with the code of the input record in said input file from said structure file;
multiplying quantity data as a third word of each of the extracted structure records by quantity data of the input record in units of the extracted structure records;
determining whether a structure record including as a first word a code which coincides with a code of a second word of each of the extracted structure records is stored in said structure file in units of the extracted structure records;
generating an input record including the code of the second word of each of the extracted structure records and the multiplied quantity data calculated for each of the extracted structure records and storing the generated input record in units of the extracted structure records in said input file when it is determined that the record is stored;
storing an output record including the code of the second word of each of the extracted structure records and the multiplied quantity data calculated for each of the extracted structure records in an output file when it is determined that the structure record is not stored; and
outputting the output records in said output file when all the steps of processing all the input records stored in said input file are completed.

4. A method of detecting all upper-level parts constituting an arbitrary lower-level part as a component, the method comprising the steps performed with a computer of:
prestoring structure records including all combinations of lower-level child parts and upper-level parent parts constituting child-to-parent relationships in a file, each of the structure records comprising a child part code as a first word and a parent part code as a second word;
inputting an input record including a code of an arbitrary child part;
extracting all structure records including as a first word a code which coincides with the code of the input record from said file;
determining whether a structure record including as a first word a code which coincides with a code of a second word of each of the extracted structure records is stored in said file in units of the extracted structure records;
generating an input record including the code of the second word of each of the extracted structure records in units of the extracted structure records when it is determined that the structure record is stored;
outputting the code of the second word of each of the extracted structure records when it is determined that the structure record is not stored; and
repeating the respective steps in units of the input records generated in the generation step.

* * * * *